United States Patent
Wu

(10) Patent No.: US 11,798,310 B2
(45) Date of Patent: Oct. 24, 2023

(54) DISPLAY SCREEN, ELECTRONIC DEVICE, AND FINGERPRINT RECOGNITION METHOD

(71) Applicant: GUANGDONG OPPO MOBILE TELECOMMUNICATIONS CORP., LTD., Guangdong (CN)

(72) Inventor: Yutong Wu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/748,994

(22) Filed: May 19, 2022

(65) Prior Publication Data
US 2022/0277582 A1    Sep. 1, 2022

Related U.S. Application Data

(63) Continuation of application No. PCT/CN2020/131063, filed on Nov. 24, 2020.

(30) Foreign Application Priority Data

Nov. 30, 2019  (CN) .......................... 201911208688.1

(51) Int. Cl.
G06K 9/28    (2006.01)
G06V 40/13   (2022.01)
(Continued)

(52) U.S. Cl.
CPC ...... *G06V 40/1306* (2022.01); *G06V 40/1359* (2022.01); *H04M 1/0268* (2013.01); *H04M 1/0266* (2013.01); *H04M 2250/22* (2013.01)

(58) Field of Classification Search
CPC .................................................. G06V 40/1306
See application file for complete search history.

(56) References Cited

U.S. PATENT DOCUMENTS 4,353,056 A    10/1982  Tsikos
2002/0152048 A1   10/2002  Hayes
(Continued)

FOREIGN PATENT DOCUMENTS

CN        1450489 A       10/2003
CN      106778508 A        5/2017
(Continued)

OTHER PUBLICATIONS

Extended European Search Report for EP Application 20893056.0 dated Nov. 21, 2022. (9 pages).
(Continued)

*Primary Examiner* — Brian Werner
(74) *Attorney, Agent, or Firm* — Young Basile Hanlon & MacFarlane, P.C.

(57) ABSTRACT

A display screen, an electronic device, and a fingerprint recognition method are provided in the present disclosure. The display screen has a display region. The display screen is provided with multiple pixels and multiple capacitors arranged at intervals in the display region. Each capacitor is corresponding to a region between two adjacent pixels. Each capacitor is configured to generate a fingerprint ridge detection signal corresponding to a fingerprint ridge region and/or generate a fingerprint valley detection signal corresponding to a fingerprint valley region. The display screen is provided with the multiple capacitors in the display region, and each capacitor is corresponding to the region between two adjacent pixels.

19 Claims, 14 Drawing Sheets

(51) Int. Cl.
    *G06V 40/12*     (2022.01)
    *H04M 1/02*     (2006.01)

(56)     References Cited

U.S. PATENT DOCUMENTS

| | | |
|---|---|---|
| 2017/0308731 A1 | 10/2017 | Evans, V et al. |
| 2018/0039349 A1* | 2/2018 | Han .................. G06F 3/041 |
| 2018/0260599 A1 | 9/2018 | Chen et al. |
| 2018/0276442 A1 | 9/2018 | Kim et al. |
| 2021/0043875 A1* | 2/2021 | Lee .................. H10K 59/65 |

FOREIGN PATENT DOCUMENTS

| | | |
|---|---|---|
| CN | 103530609 B | 7/2017 |
| CN | 107633200 A | 1/2018 |
| CN | 107946346 A | 4/2018 |
| CN | 108196735 A | 6/2018 |
| CN | 108596147 A | 9/2018 |

OTHER PUBLICATIONS

International search report with English Translation issued in corresponding PCT/CN2020/131063 dated Feb. 25, 2021.
Chinese Office Action with English Translation for CN Application 201911208688.1 dated Feb. 16, 2023. (23 pages).

\* cited by examiner

DISPLAY SCREEN, ELECTRONIC DEVICE, AND FINGERPRINT RECOGNITION METHOD

CROSS-REFERENCE TO RELATED APPLICATION(S)

This application is a continuation application of International Application No. PCT/CN2020/131063, filed Nov. 24, 2020, which claims priority to Chinese Patent Application No. 201911208688.1, filed Nov. 30, 2019, the entire disclosures of both of which are incorporated herein by reference.

TECHNICAL FIELD

This application relates to the technical field of fingerprint recognition, and in particular, to a display screen, an electronic device, and a fingerprint recognition method.

BACKGROUND

Currently, capacitive fingerprint modules are widely used in mobile phones. However, at present, the capacitive fingerprint module is independent of a display screen of the mobile phone, and the capacitive fingerprint module is difficult to be integrated into the display screen, which makes it difficult to increase a screen-to-body ratio of the mobile phone.

SUMMARY

A display screen, an electronic device, and a fingerprint recognition method are provided in the present disclosure.

A display screen is provided by the present disclosure. The display screen has a display region. The display screen is provided with multiple pixels and multiple capacitors arranged at intervals in the display region. An orthographic projection of the capacitor on the display region is located between two adjacent pixels. The capacitor is configured to generate a fingerprint ridge detection signal corresponding to a fingerprint ridge region and/or generate a fingerprint valley detection signal corresponding to a fingerprint valley region. The fingerprint ridge detection signal is formed due to a first capacitance variation which is brought by the fingerprint ridge region to the capacitor corresponding to the fingerprint ridge region when the fingerprint ridge region is adjacent to the display screen. The fingerprint valley detection signal is formed due to a second capacitance variation which is brought by the fingerprint valley region to the capacitor corresponding to the fingerprint valley region when the fingerprint valley region is adjacent to the display screen.

An electronic device is provided by the present disclosure. The electronic device includes the foregoing display screen.

A fingerprint recognition method is provided by the present disclosure. The fingerprint recognition method is applicable to the foregoing electronic device and includes the following. A pressed region is obtained. A scanning signal is sent to a capacitor in the pressed region. A fingerprint detection signal of the capacitor in the pressed region is collected, where the fingerprint detection signal is formed by receiving the scanning signal and generating a capacitance variation under influence of a fingerprint by the capacitor. A fingerprint image is formed according to the fingerprint detection signal.

BRIEF DESCRIPTION OF DRAWINGS

In order to describe technical solutions of embodiments of the present disclosure more clearly, the following will give a brief introduction to the accompanying drawings used for describing the embodiments. Apparently, the accompanying drawings hereinafter described are merely some embodiments of the present disclosure. Based on these drawings, those of ordinary skill in the art can also obtain other drawings without creative effort.

DETAILED DESCRIPTION

Figure 1:
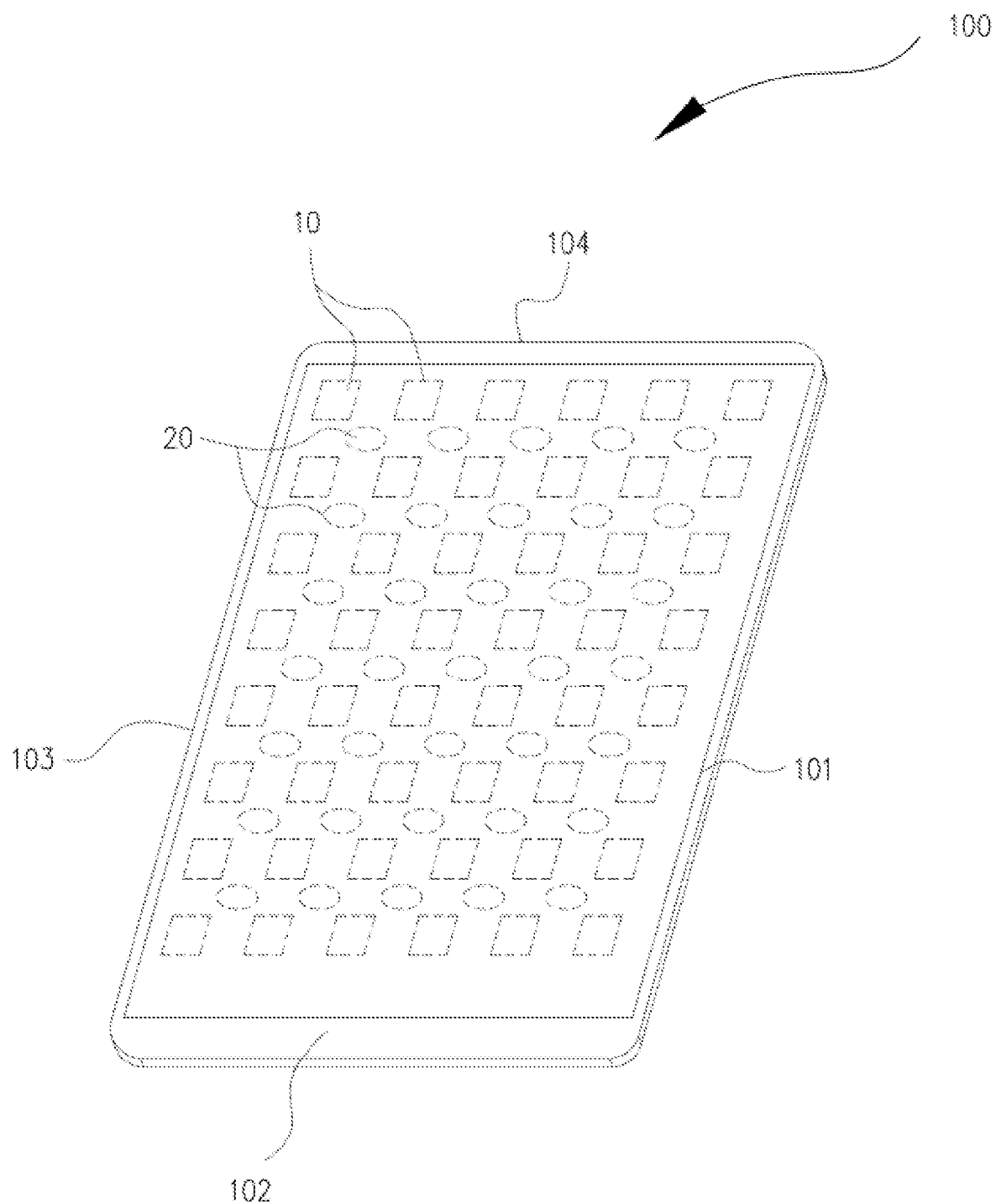
FIG. 1 is a schematic view of a display screen provided by an embodiment of the present disclosure.

In a first aspect of the present disclosure, a display screen having a display region is provided. The display screen is provided with multiple pixels and multiple capacitors arranged at intervals in the display region. An orthographic projection of the capacitor on the display region is located between two adjacent pixels. The capacitor is configured to generate a fingerprint ridge detection signal corresponding to a fingerprint ridge region or generate a fingerprint valley detection signal corresponding to a fingerprint valley region, where the fingerprint ridge detection signal is formed due to a first capacitance variation which is brought by the fingerprint ridge region to the capacitor corresponding to the fingerprint ridge region when the fingerprint ridge region is adjacent to the display screen. The fingerprint valley detection signal is formed due to a second capacitance variation which is brought by the fingerprint valley region to the capacitor corresponding to the fingerprint valley region when the fingerprint valley region is adjacent to the display screen.

In an embodiment of the first aspect of the present disclosure, the capacitor includes a first electrode and a second electrode corresponding to the first electrode. An orthographic projection of the first electrode on a surface of the display screen coincides with an orthographic projection of the second electrode on the surface of the display screen.

In an embodiment of the first aspect of the present disclosure, the display screen further includes a capacitive dielectric layer, where the capacitive dielectric layer includes multiple capacitive dielectric units, and the capacitive dielectric unit is located between the first electrode and the second electrode.

In an embodiment of the first aspect of the present disclosure, an outer diameter of the capacitive dielectric unit is greater than or equal to an outer diameter of the first electrode, and is greater than or equal to an outer diameter of the second electrode.

In an embodiment of the first aspect of the present disclosure, the multiple pixels are arranged in an array. The display screen assembly is provided with multiple transverse wires and multiple longitudinal wires. The transverse wire is arranged between two adjacent rows of pixels. The longitudinal wire is arranged between two adjacent columns of pixels. The first electrode of the capacitor overlaps with the second electrode of the capacitor at an intersection of the transverse wire and the longitudinal wire. The first electrode and the second electrode are respectively connected with the transverse wire and the longitudinal wire.

In an embodiment of the first aspect of the present disclosure, the display screen includes multiple first pixels arranged in an array, multiple second pixels arranged in an array, and multiple third pixels arranged in an array. The multiple first pixels are staggered with the multiple second pixels at intervals in a transverse direction and a longitudinal direction. Each row of third pixels is located between two adjacent rows of first pixels, where in each row of third pixels, the third pixel is staggered from the first pixel and the second pixel. Each column of third pixels is located between two adjacent columns of first pixels, where in each column of third pixels, the third pixel is staggered from the first pixel and the second pixel.

In an embodiment of the first aspect of the present disclosure, each transverse wire has multiple first bending points in equidistant arrangement in the transverse direction, multiple second bending points in equidistant arrangement in the transverse direction, and multiple connecting lines each connected between the first bending point and the second bending point. Each first bending point is disposed between the first pixel and the second pixel adjacent to the first pixel in each row. Each second bending point is disposed between two adjacent third pixels in each row.

In an embodiment of the first aspect of the present disclosure, each longitudinal wire has multiple third bending points in equidistant arrangement in the longitudinal direction, multiple fourth bending points in equidistant arrangement in the longitudinal direction, and multiple connecting lines each connected between the third bending point and the fourth bending point. Each third bending point is disposed between the first pixel and the second pixel adjacent to the first pixel in each column. Each fourth bending point is disposed between two adjacent third pixels in each column. The third bending point is opposite to the first bending point in a one-to-one correspondence. The fourth bending point is opposite to the second bending point in a one-to-one correspondence.

In an embodiment of the first aspect of the present disclosure, multiple first electrodes are connected with the transverse wires at positions corresponding to the multiple first bending points and the multiple second bending points. Multiple second electrodes are connected with the longitudinal wires at positions corresponding to the multiple third bending points and the multiple fourth bending points.

In an embodiment of the first aspect of the present disclosure, the transverse wire has multiple transverse-overlapping sections arranged at intervals. The longitudinal wire has multiple longitudinal-overlapping sections arranged at intervals. The multiple transverse-overlapping sections overlap with the multiple longitudinal-overlapping sections. The first electrode is disposed at the multiple transverse-overlapping sections. The second electrode is disposed at the multiple longitudinal-overlapping sections.

In an embodiment of the first aspect of the present disclosure, the transverse-overlapping section is connected between two first electrodes. The longitudinal-overlapping section is connected between the two second electrodes.

In an embodiment of the first aspect of the present disclosure, the first electrode extends along the transverse-overlapping section. The second electrode extends along the longitudinal-overlapping section. The first electrode overlaps with the second electrode.

In an embodiment of the first aspect of the present disclosure, a width of the first electrode is greater than a width of the transverse-overlapping section. A width of the second electrode is greater than a width of the longitudinal-overlapping section.

In an embodiment of the first aspect of the present disclosure, the display screen assembly includes a protective layer and a pixel layer stacked with the protective layer. The multiple pixels are arranged in the pixel layer. The multiple capacitors are arranged between the protective layer and the pixel layer.

In an embodiment of the first aspect of the present disclosure, the display screen further includes an upper polarizer layer stacked between the protective layer and the pixel layer, a liquid crystal layer, a thin film transistor layer, a lower polarizer layer, a base layer, and a backlight layer that are sequentially stacked on a side of the pixel layer away from the protective layer. The multiple capacitors are arranged between the upper polarizer layer and the protective layer.

In an embodiment of the first aspect of the present disclosure, the display screen further includes an upper polarizer layer stacked between the protective layer and the pixel layer, a liquid crystal layer, a thin film transistor layer, a lower polarizer layer, a base layer, and a backlight layer that are sequentially stacked on a side of the pixel layer away from the protective layer. The multiple capacitors are arranged between the upper polarizer layer and the protective layer.

In an embodiment of the first aspect of the present disclosure, the display screen includes a cathode layer, an organic electroluminescent layer, an anode layer, and a base layer that are sequentially stacked with the protective layer, the multiple pixels being arranged in the organic electroluminescent layer. The multiple capacitors are arranged between the cathode layer and the protective layer.

In an embodiment of the first aspect of the present disclosure, a region where the multiple capacitors are arranged forms a fingerprint recognition region. A periphery of the fingerprint recognition region is aligned with a periphery of the display region.

In a second aspect of the present disclosure, an electronic device is provided. The electronic device includes the display screen according to any of the above embodiments of the first aspect of the present disclosure.

In a third aspect of the present disclosure, a fingerprint recognition method is provided. The method is applicable to the electronic device in the second aspect of the present disclosure. The method includes the following. A pressed region is obtained. A scanning signal is sent to a capacitor in the pressed region. A fingerprint detection signal of the capacitor in the pressed region is collected. The fingerprint detection signal is formed by receiving the scanning signal and generating a capacitance variation under influence of a fingerprint by the capacitor. A fingerprint image is formed according to the fingerprint detection signal.

Technical solutions in embodiments of the present disclosure will be described clearly and completely hereinafter with reference to the accompanying drawings in the embodiments of the disclosure.

A display screen, an electronic device, and a fingerprint recognition method are provided by the embodiments of the present disclosure. The display screen is applicable to the electronic device. The display screen is capable of fingerprint recognition. The electronic device may be a mobile phone, a tablet computer, a notebook computer, a media player, etc., and may also be a financial terminal device such as an automated teller machine (ATM).

Figure 2:
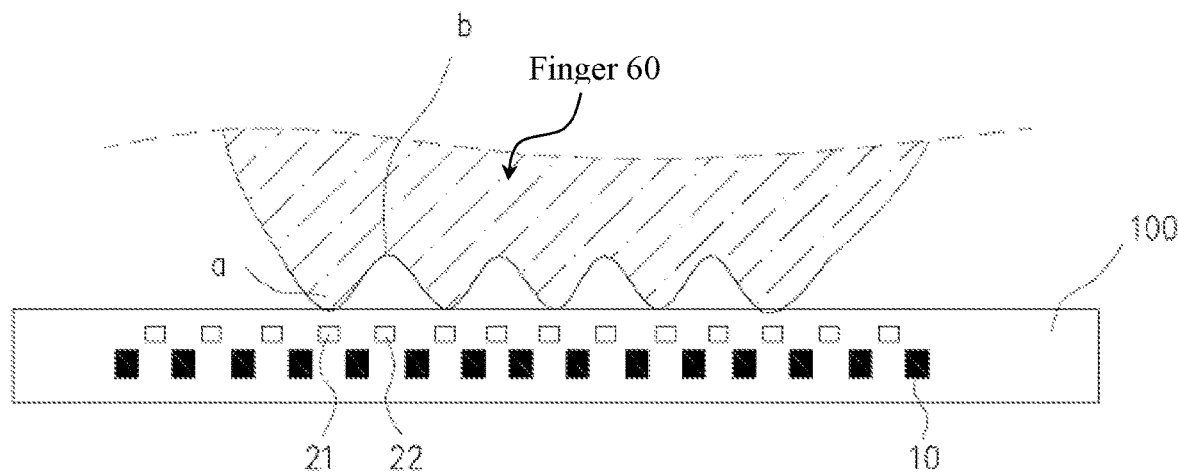
FIG. 2 is a schematic cross-sectional view of a display screen provided by an embodiment of the present disclosure.

Referring to FIG. 1 and FIG. 2, a display screen 100 is provided by the present disclosure. The display screen 100 has a display region 101. The display screen 100 is provided with multiple pixels 10 and multiple capacitors 20 arranged at intervals in the display region 101. An orthographic projection of each capacitor 20 on the display region 101 is located between two adjacent pixels 10. In an embodiment, the orthographic projection of each capacitor 20 on the display region 101 is located between orthographic projections of two adjacent pixels 10 on the display region 101. Each capacitor 20 is configured to generate a fingerprint ridge detection signal corresponding to a fingerprint ridge region a and/or generate a fingerprint valley detection signal corresponding to a fingerprint valley region b. The fingerprint ridge detection signal is formed due to a first capacitance variation which is brought by the fingerprint ridge region a to the capacitor 20 corresponding to the fingerprint ridge region a when the fingerprint ridge region is adjacent to the display screen 100. In an embodiment, when the fingerprint ridge region is adjacent to the display screen 100, the fingerprint ridge region may be in contact with or spaced apart from the display screen 100. The fingerprint valley detection signal is formed due to a second capacitance variation which is brought by the fingerprint valley region b to the capacitor 20 corresponding to the fingerprint valley region b when the fingerprint valley region is adjacent to the display screen 100. In an embodiment, when the fingerprint valley region is adjacent to the display screen 100, the fingerprint valley region may be in contact with or spaced apart from the display screen 100. It can be understood that the display screen 100 is applicable to an electronic device, and the electronic device may be a mobile phone, a tablet computer, a notebook computer, etc.

The display screen 100 is provided with the multiple capacitors 20 in the display region 101. Each of the multiple capacitors 20 is corresponding to a region between two adjacent pixels 10, so that orthographic projections of the capacitors 20 on the display region 101 do not overlap with orthographic projections of the pixels 10 on the display region 101 and the capacitors 20 are independent of the pixels 10, which can ensure that the display screen 100 can use the multiple pixels 10 for normal display, and the fingerprint ridge detection signal and the fingerprint valley detection signal can be sensed with aid of the multiple capacitors 20 to realize user fingerprint image recognition. As such, both the display function and the fingerprint recognition function can be realized in the display region 101 of the display screen 100, and a screen-to-body ratio is increased.

In an embodiment, the display screen 100 further has a non-display region 102 connected with the display region 101. The non-display region 102 forms a black border of the display screen 100. The display screen 100 is a full screen, which has a screen-to-body ratio greater than 80%. In an implementation, the display screen 100 may have a screen-to-body ratio of 91%. Further, the screen-to-body ratio of the display screen 100 may be close to 100%. A periphery of the display region 101 of the display screen 100 is approximately flush with a periphery of the display screen 100, which increases the screen-to-body ratio of the display screen 100. The display screen 100 has two opposite long edges 103 and two opposite short edges 104. The two short edges 104 are connected between the two long edges 103. The multiple pixels 10 may be arranged in array in a longitudinal direction parallel to the long edges 103 and a transverse direction parallel to the short edges 104. Each pixel 10 can emit light with a certain chromaticity, so that the light emitted by each pixel 10 can form a pixel of a display image, and the lights emitted by the multiple pixels 10 can form the display image. A distance between two adjacent pixels 10 may be approximately equal, may be set randomly, or may be arranged according to a preset calculation method. A color blocking block may be disposed between two adjacent pixels 10. Wires or microelectronic components between two adjacent pixels 10 can be shielded with the color blocking block, which improves the display effect of the display screen 100. The capacitor 20 can be disposed in the color blocking block, to make full use of an element-arrangement space of the display screen 100. The display screen 100 has a surface facing a user and a back surface opposite to the surface. The multiple pixels 10 and the multiple capacitors 20 are located between the surface and the back surface, as such, the multiple capacitors 20 are integrated into the display screen 100. In other embodiments, if the display region 101 of the display screen 100 is a circular display region 101 or an irregularly shaped display region 101, the multiple pixels 10 may also be arranged along multiple circular rings, or along multiple irregular curves.

In an embodiment, a spacing between two adjacent capacitors 20 is smaller than or equal to a spacing between a fingerprint ridge and a fingerprint valley adjacent to the fingerprint ridge, which can increase a density of the multiple capacitors 20. Each capacitor 20 is regarded as each pixel of a fingerprint image, and the multiple capacitors 20 can obtain a fingerprint image with high pixels, which increases fingerprint recognition clarity.

It can be understood that the capacitor 20 is a mutual-capacitance sensing device. The capacitor 20 differs from a self-capacitance sensing device. The capacitor 20 may be composed of two conductors. The capacitor 20 has a capability of storing charges between the two conductors and can sense an external dielectric according to a variation in the charges stored. The self-capacitance sensing device is composed of one conductor which can store a certain amount of charge. A capacitor is formed between one conductor of the self-capacitance sensing device and an external dielectric, and the self-capacitance sensing device can sense the external dielectric according to a sensed capacitance. That is, the capacitor 20 senses the external dielectric by sensing a capacitance variation, in contrast, the self-capacitance sensing device senses the external dielectric by sensing a capacitance.

Each capacitor 20 can store a certain amount of charge. When the display screen 100 is not touched by a fingerprint, each capacitor 20 is connected with an equal electric field voltage, and the amount of charge of each capacitor 20 is equal, that is, the capacitance of each capacitor 20 is equal. When the display screen 100 is in contact with the fingerprint, since the fingerprint is a dielectric and can absorb the charge of the capacitor 20, a charge field of the capacitor 20 changes, that is, the capacitance of the capacitor 20 changes.

Figure 3:
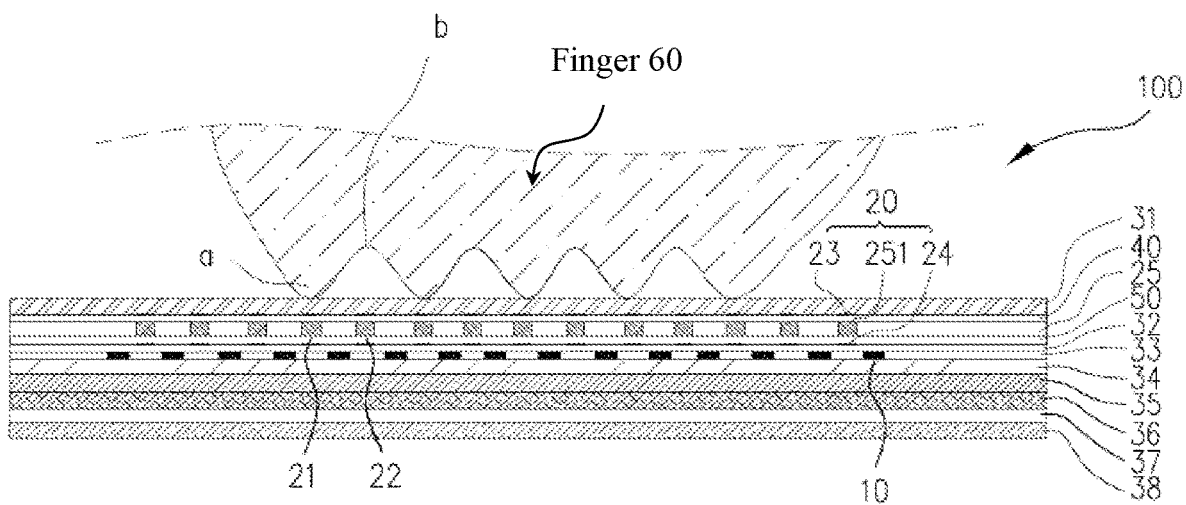
FIG. 3 is another schematic cross-sectional view of a display screen provided by an embodiment of the present disclosure.

Referring to FIG. 3, since the fingerprint has the fingerprint ridge region a and the fingerprint valley region b, when the fingerprint is in contact with the surface of the display screen 100, the capacitor 20 corresponding to the fingerprint ridge region a is defined as a first capacitor 21, and the capacitor 20 corresponding to the fingerprint valley region b is defined as a second capacitor 22.

Before the fingerprint comes into contact with the surface of the display screen 100, the first capacitor 21 and the second capacitor 2 are each connected with the same electric field voltage, and thus, the amount of charge stored in the first capacitor 21 is the same as the amount of charge stored in the second capacitor 22, so that a capacitance of the first capacitor 21 is the same as that of the second capacitor 22.

When the fingerprint is in contact with the surface of the display screen 100, the fingerprint ridge region a is in contact with the surface of the display screen 100, and there is a distance between the fingerprint valley region b and the surface of the display screen 100. The fingerprint ridge region a absorbs the charge of the first capacitor 21, so that the first capacitor 21 generates a first capacitance variation, and the fingerprint valley region b absorbs the charge of the second capacitor 22, so that the second capacitor 22 generates a second capacitance variation.

Since a distance between the fingerprint ridge region a and the first capacitor 21 is smaller than the distance between the fingerprint valley region b and the second capacitor 22, the amount of charge absorbed by the fingerprint ridge region a from the first capacitor 21 is greater than the amount of charge absorbed by the fingerprint valley region b from the second capacitor 22, so that the first capacitance variation is greater than the second capacitance variation. By converting the first capacitance variation or the second capacitance variation sensed by each capacitor 20 into a data signal, a coordinate position of the first capacitor 21 corresponding to the fingerprint ridge region a can be recognized, and a coordinate position of the second capacitor 22 corresponding to the fingerprint valley region b can be recognized, and the fingerprint image can be obtained according to the coordinate position of the first capacitor 21 and the coordinate position of the second capacitor 22.

Further, each capacitor 20 includes a first electrode 23 and a second electrode 24 opposite to the first electrode 23. The display screen 100 further includes a capacitive dielectric layer 25. The capacitive dielectric layer 25 includes multiple capacitive dielectric units 251. Each capacitive dielectric unit 251 is located between the first electrode 23 and the second electrode 24.

In an embodiment, the first electrode 23 is opposite to the second electrode 24 in a direction perpendicular to the surface of the display screen 100. An orthographic projection of the first electrode 23 on the surface of the display screen 100 coincides with an orthographic projection of the second electrode 24 on the surface of the display screen 100. An orthographic projection region of the multiple first electrodes 23 on the surface of the display screen 100 is in a fingerprint recognition region. An outer diameter of the first electrode 23 and a distance between two adjacent first electrodes 23 can be set as needed. The first electrode 23 and the second electrode 24 each may be a circular metal sheet, a rectangular metal sheet, or a triangular metal sheet. The first electrode 23 is disposed in parallel to the second electrode 24. Each capacitive dielectric unit 251 of the capacitive dielectric layer 25 is connected with the corresponding first electrode 23 and the second electrode 24, so that the first electrode 23 and the second electrode 24 can store charges through the capacitive dielectric unit 251 when the electric field voltage is applied to the first electrode 23 and the second electrode 24, and the first electrode 23, the capacitive dielectric unit 251, and the second electrode 24 form the capacitor 20. In an embodiment, each capacitive dielectric unit 251 of the capacitive dielectric layer 25 is indirectly connected with the corresponding first electrode 23 and the second electrode 24.

It can be understood that the outer diameter of each of the first electrode 23 and the second electrode 24 is R, a distance between the first electrode 23 and the second electrode 24 is D, a dielectric constant of the capacitive dielectric unit 251 is ε, the capacitance of each capacitor 20 is C, then the capacitance C of each capacitor 20 satisfies the following formula:

$$C=\varepsilon \times (\pi \times R^2)/4D.$$

As can be seen from the above formula, the capacitance of each capacitor 20 can be adjusted by adjusting the outer diameter R of the first electrode 23 (i.e., an outer diameter of the capacitor 20) and the distance D between the first electrode 23 and the second electrode 24, such that an allowable capacitance variation of each capacitor 20 can be adjusted, that is, a degree of a difference between the first capacitance variation and the second capacitance variation can be increased, which can effectively distinguish the first capacitance variation from the second capacitance variation, that is, effectively distinguish the fingerprint ridge detection signal and the fingerprint valley detection signal, so that the fingerprint image obtained is more accurate, and the fingerprint recognition efficiency of the multiple capacitors 20 is improved.

In order to ensure sufficient charge storage between the first electrode 23 and the second electrode 24 of each capacitor 20, an outer diameter of the capacitive dielectric unit is larger than or equal to the outer diameter of the first electrode 23, and the outer diameter of the capacitive dielectric unit is larger than or equal to the outer diameter of the second electrode 24.

It can be understood that, the capacitive dielectric unit 251 is arranged between the first electrode 23 and the second electrode 24 to increase the dielectric constant ε, so that the capacitance C of the capacitor 20 can be increased, and the fingerprint recognition accuracy of the multiple capacitors 20 can be improved. In other embodiments, it is also possible to omit the capacitive dielectric unit 251 between the first electrode 23 and the second electrode 24, and the capacitance C of the capacitor 20 can be increased by increasing the outer diameter R of the first electrode 23 or decreasing the distance D between the first electrode 23 and the second electrode 24.

In an embodiment, the display screen 100 is a liquid crystal display (LCD) screen. The display screen 100 includes a protective layer 31, a first electrode layer 40, a capacitive dielectric layer 25, a second electrode layer 50, an upper polarizer layer 32, a pixel layer 33, a liquid crystal layer 34, a thin film transistor layer 35, a lower polarizer layer 36, a base layer 37, and a backlight layer 38 that are sequentially stacked. The protective layer 31 is a transparent glass layer for protecting the first electrode layer 40. A touch layer can be integrated in the protective layer 31, and the touch layer can be used to sense a touch region, so that the display screen 100 can receive a touch control signal. Multiple first electrodes 23 are disposed in the first electrode layer 40. The first electrode layer 40 is further provided with conductive cables electrically connected with the multiple first electrodes 23, and the conductive cables are used to transmit electrical signals for the first electrodes 23. Multiple capacitive dielectric units 251 are disposed in the capacitive dielectric layer 25. Multiple second electrodes 24 are disposed in the second electrode layer 50. The second electrode layer 50 is further provided with conductive cables electrically connected to the multiple first electrodes 23, and the conductive cables are used to transmit electrical signals for the second electrodes 24. The upper polarizer layer 32, the pixel layer 33, the liquid crystal layer 34, the thin film transistor layer 35, the lower polarizer layer 36, the base layer 37, and the backlight layer 38 are sequentially laminated, so that the display screen 100 can display images. Multiple pixels 10 are disposed in the pixel layer 33. Orthographic projections of the multiple pixels 10 on the display region 101 do not overlap with orthographic projections of the multiple capacitors 20 on the display region 101, which ensures an effective displaying of the display screen 100 in the display region 101 and a relatively high screen-to-body ratio of the display region 101 of the display screen 100.

Figure 4:
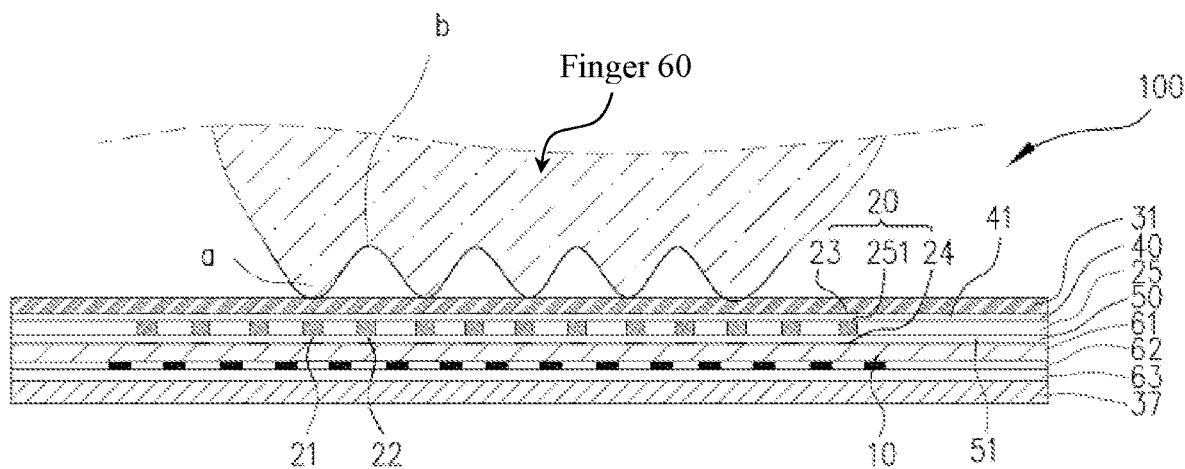
FIG. 4 is a schematic cross-sectional view of a display screen provided by another embodiment of the present disclosure.

In another embodiment, referring to FIG. 4, the display screen 100 is an organic light-emitting diode (OLED) screen. The display screen 100 includes a protective layer 31, a first electrode layer 40, a capacitive dielectric layer 25, a second electrode layer 50, a cathode layer 61, an organic electroluminescent layer 62, a node layer 63, and a base layer 37 that are sequentially stacked. Multiple pixels 10 are disposed in the organic electroluminescent layer 62.

Figure 5:
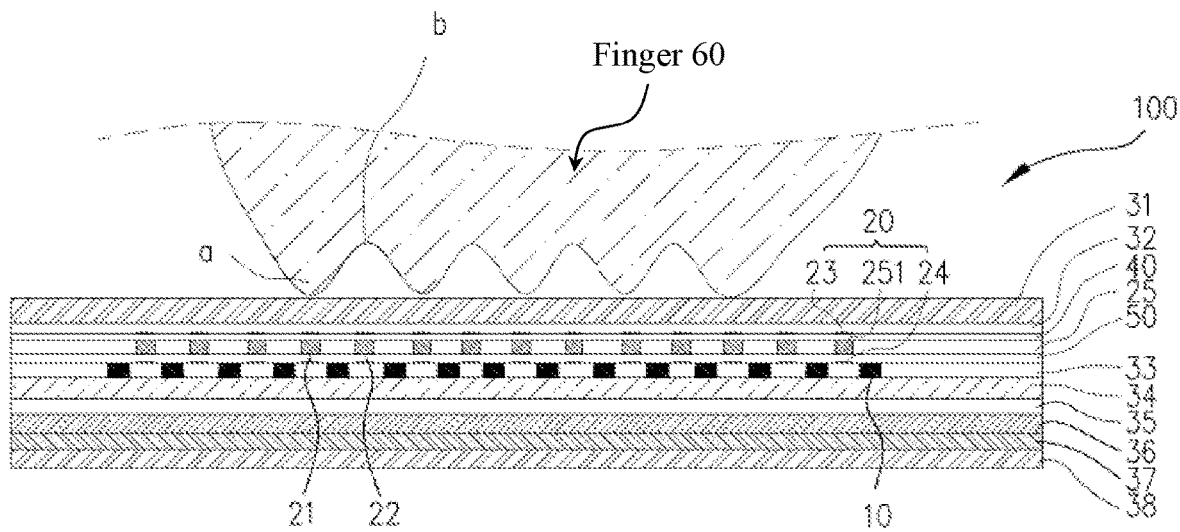
FIG. 5 is a schematic cross-sectional view of a display screen provided by another embodiment of the present disclosure.

In another embodiment, referring to FIG. 5, which is substantially the same as the embodiment illustrated in FIG. 3, except that the first electrode layer 40, the capacitive dielectric layer 25, and the second electrode layer 50 are disposed between the upper polarizer layer 32 and the pixel layer 33. A fingerprint-recognition-layer structure formed by the first electrode layer 40, the capacitive dielectric layer 25, and the second electrode layer 50 senses the fingerprint via the upper polarizer layer 32 and the protective layer 31. In other embodiments, the first electrode layer 40, the capacitive dielectric layer 25, and the second electrode layer 50 can also be disposed between the pixel layer 33 and the liquid crystal layer 34, or between the liquid crystal layer 34 and the thin film transistor layer 35, or between the thin film transistor layer 35 and the lower polarizer layer 36, or between the lower polarizer layer 36 and the backlight layer 38.

Figure 6:
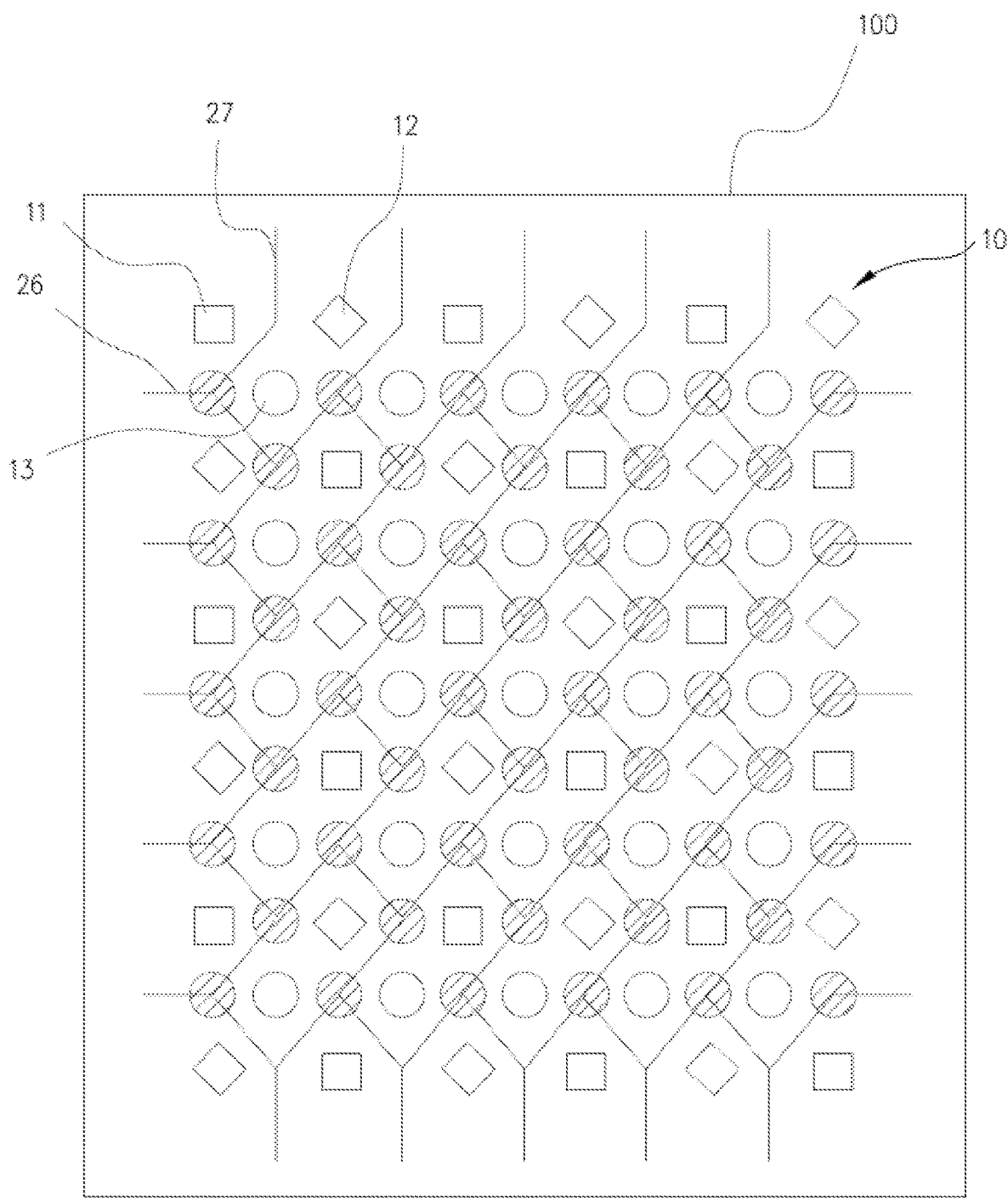
FIG. 6 is a partial schematic view of a display screen provided by an embodiment of the present disclosure.
Figure 7:
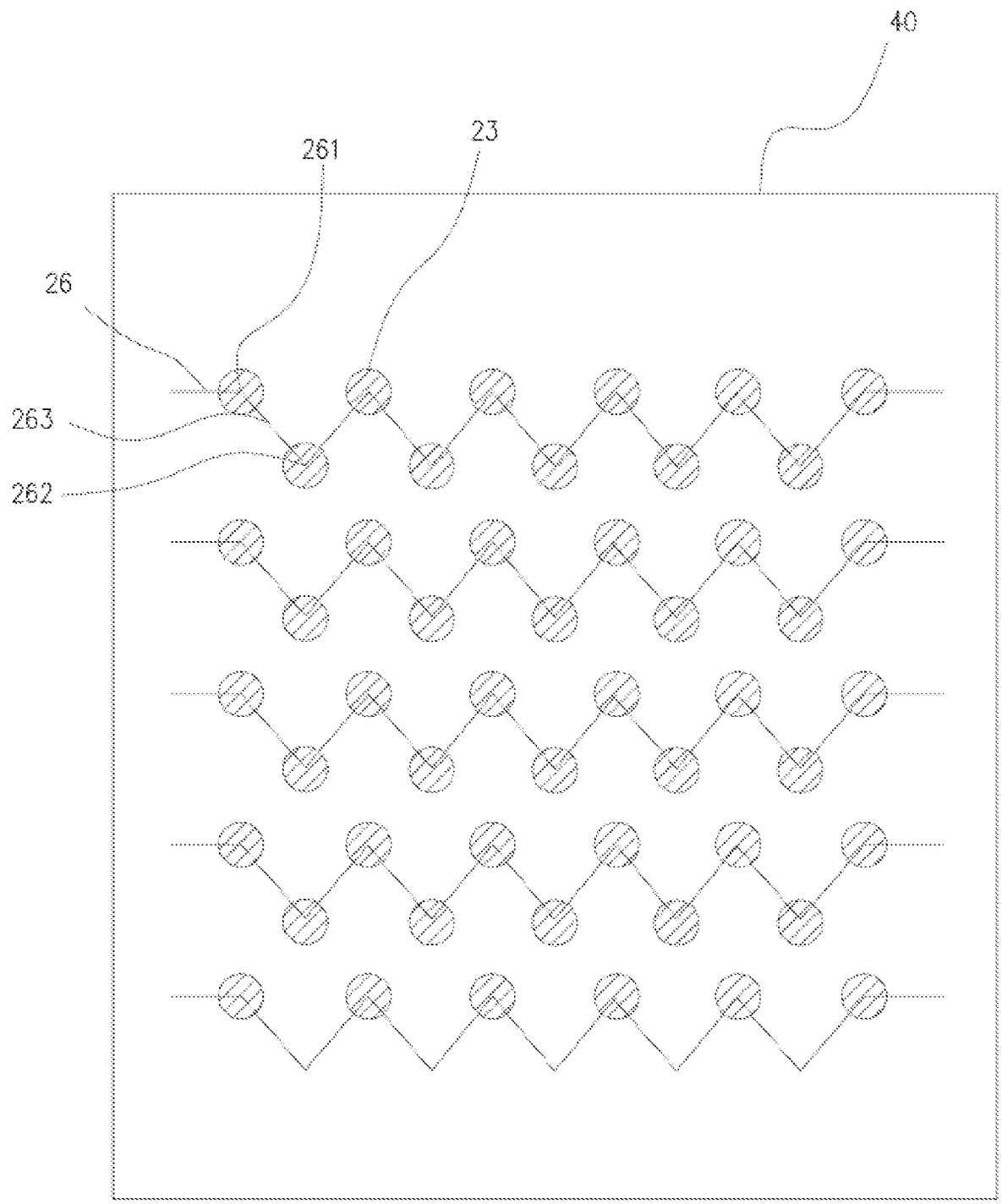
FIG. 7 is a schematic view of a first electrode layer of a display screen provided by an embodiment of the present disclosure.
Figure 8:
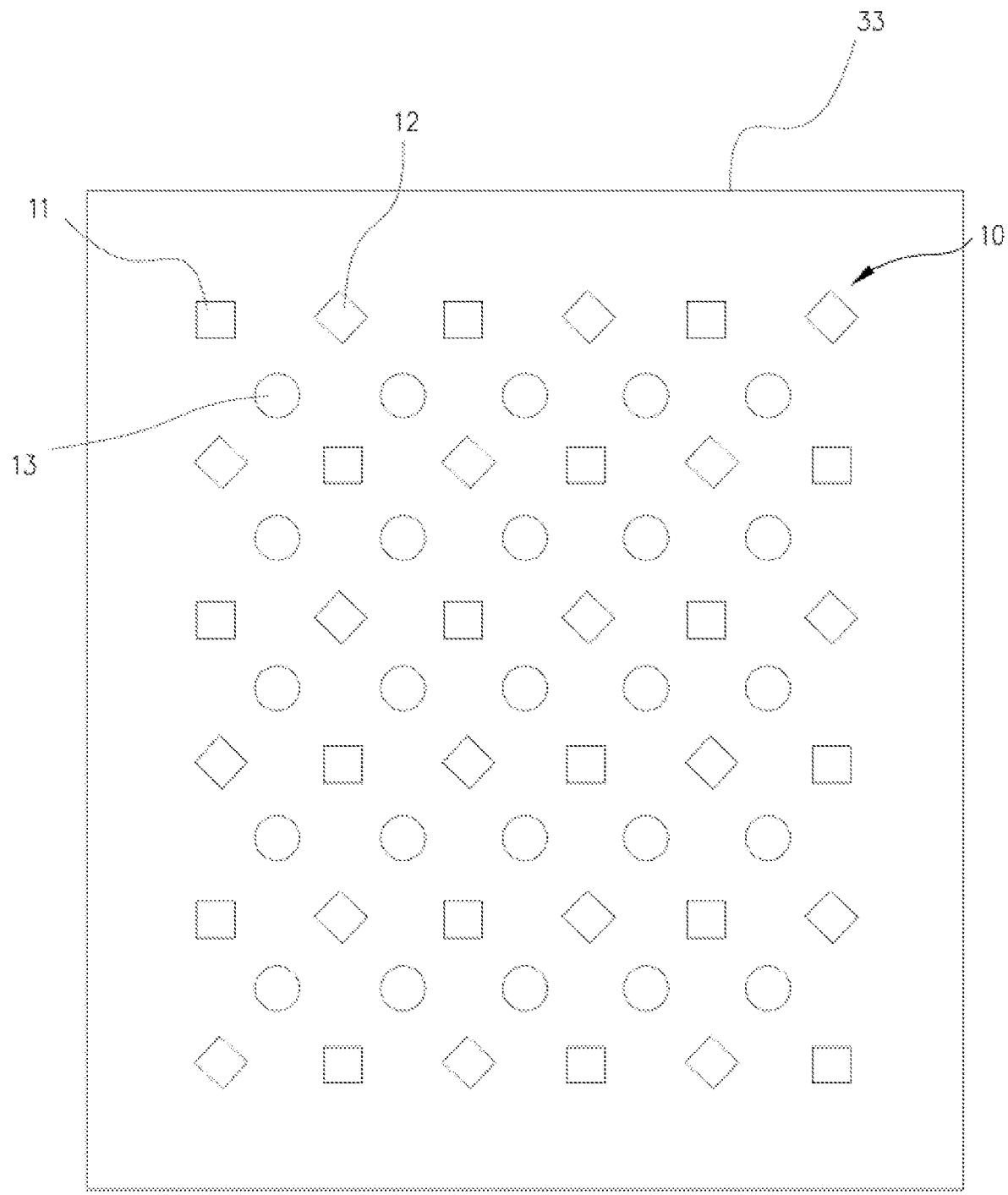
FIG. 8 is a schematic view of a pixel layer of a display screen provided by an embodiment of the present disclosure.
Figure 9:
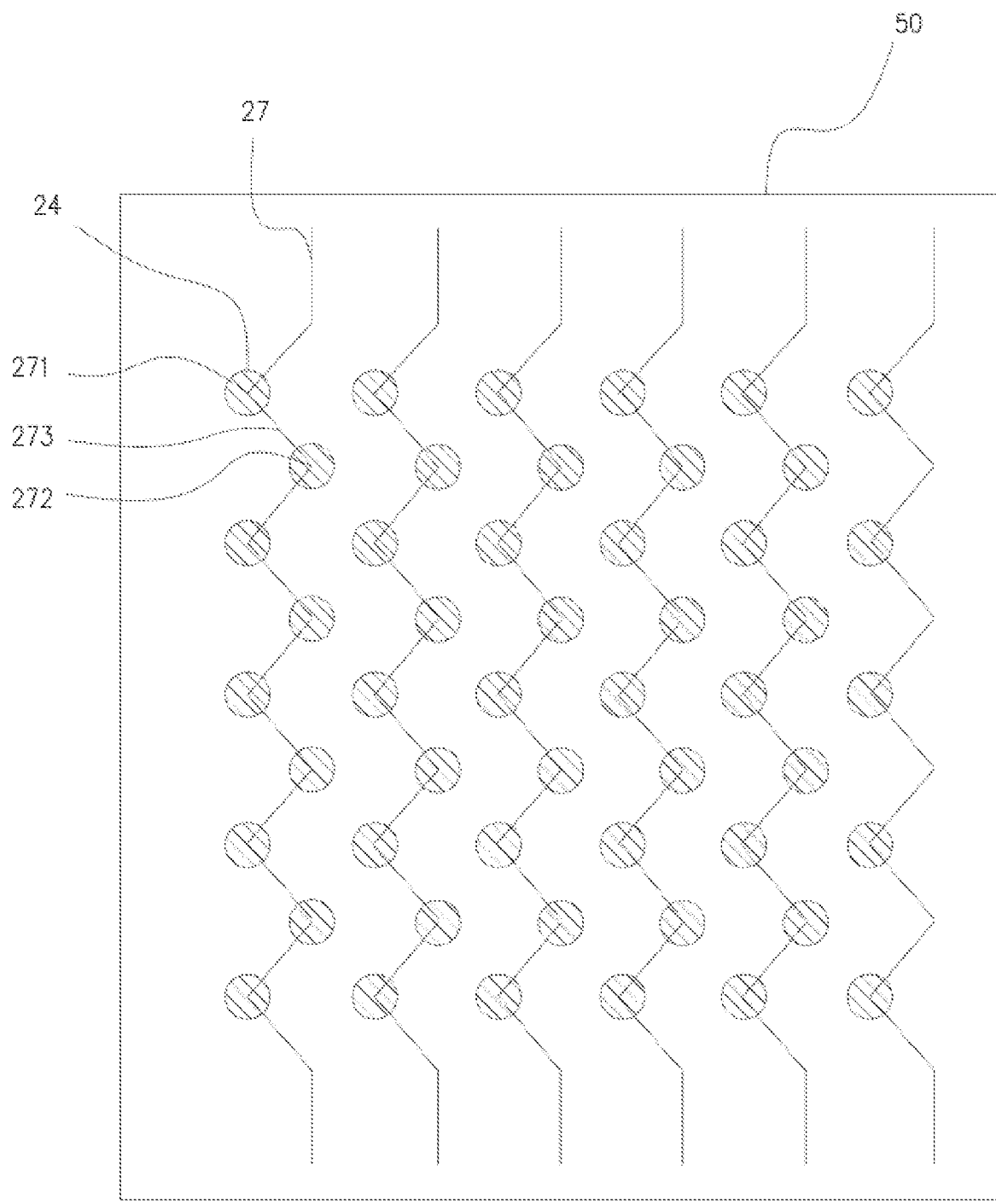
FIG. 9 is a schematic view of a second electrode layer of a display screen provided by an embodiment of the present disclosure.

Further, referring to FIG. 6, the multiple pixels 10 are arranged in an array. The display screen 100 is provided with multiple transverse wires 26 and multiple longitudinal wires 27. Each transverse wire 26 is arranged between two adjacent rows of pixels 10, and each longitudinal wire 27 is arranged between two adjacent columns of pixels 10. The first electrode 23 of the capacitor 20 overlaps with the second electrode 24 of the capacitor 20 at an intersection of the transverse wire 26 and the longitudinal wire 27. In each capacitor 20, the orthographic projection of the first electrode 23 on the display region 101 overlaps with the orthographic projection of the second electrode 24 on the display region 101 at an intersection of an orthographic projection of the transverse wire 26 on the display region 101 and an orthographic projection of the longitudinal wire 27 on the display region 101. The first electrode 23 is connected with the transverse wire 26 and the second electrode 24 is connected with the longitudinal wire 27. In an embodiment, referring to FIGS. 6-9, the display screen 100 includes multiple first pixels 11 arranged in an array, multiple second pixels 12 arranged in an array, and multiple third pixels 13 arranged in an array. The first pixels 11 is staggered with the second pixels 12 at intervals in the transverse direction and the longitudinal direction. Each row of third pixels 13 is located between two adjacent rows of first pixels 11, where in each row of third pixels 13, the third pixel 13 is staggered from the first pixel 11 and the second pixel 12. Each column of third pixels 13 is located between two adjacent columns of first pixels 11, where in each column of third pixels 13, the third pixel 13 is staggered from the first pixel 11 and the second pixel 12. The first pixel 11, the second pixel 12, and the third pixel 13 may be different from one another in color. The first pixel 11, the second pixel 12, and the third pixel 13 are disposed in the pixel layer 33. In other embodiments, the display screen 100 may also be provided with multiple fourth pixels arranged in an array. The multiple fourth pixels and the multiple third pixels 13 are staggered in the transverse direction and the longitudinal direction.

In an embodiment, each transverse wire 26 extends in a serpentine-bending line. Each transverse wire 26 has multiple first bending points 261 in equidistant arrangement in the transverse direction, multiple second bending points 262 in equidistant arrangement in the transverse direction, and multiple connecting lines each connected between the first bending point and the second bending point. In an embodiment, the above bending point may be a polyline point. Each first bending point 261 is disposed between the first pixel 11 and the second pixel 12 adjacent to the first pixel 11 in a corresponding column, and each second bending point 262 is disposed between two adjacent third pixels 13 in a corresponding column. Each of the longitudinal wires 27 extends in a serpentine-bending line. Each longitudinal wire 27 has multiple third bending points 271 in equidistant arrangement in the longitudinal direction, multiple fourth bending points 272 in equidistant arrangement in the longitudinal direction, and multiple connecting lines each connected between the third bending point 271 and the fourth bending point 272. Each third bending point 271 is disposed between the first pixel 11 and the second pixel 12 adjacent to the first pixel 11 in a corresponding column. Each fourth bending point 272 is disposed between two adjacent third pixels 13 in a corresponding column. The third bending point 271 is opposite to the first bending point 261 in a one-to-one correspondence, and the fourth bending point 272 is opposite to the second bending point 262 in a one-to-one correspondence. Multiple first electrodes 23 are connected with the transverse wires at positions corresponding to the multiple first bending points 261 and the multiple second bending points 262. Multiple second electrodes 24 are connected with the longitudinal wires at positions corresponding to the multiple third bending points 271 and the multiple fourth bending points 272.

The first electrode 23 is a circular metal sheet. The second electrode 24 is a circular metal sheet. The transverse wires 26 and the multiple first electrodes 23 are disposed on the first electrode layer 40. The longitudinal wires 27 and the multiple second electrodes 24 are disposed on the second electrode layer 50. In an embodiment, the first electrode layer 40 may be provided with a first base layer 41, and one side of the first base layer 41 is attached to the protective layer 31. The transverse wires 26 and the multiple first electrodes 23 are formed on one side of the first base layer 41 close to the protective layer 31. In an embodiment, the transverse wires 26 and the multiple first electrodes 23 are sandwiched between the first electrode layer 40 and the protective layer 31. The second electrode layer 50 is provided with a second base layer 51, and one side of the second base layer 51 is attached to the upper polarizer layer 32. The longitudinal wires 27 and the second electrodes 24 are formed on one side of the second base layer 51 close to the upper polarizer layer 32. In an embodiment, the longitudinal wires 27 and the second electrodes 24 are sandwiched between the second electrode layer 50 and the upper polarizer layer 32. The transverse wire 26 may be a silver wire, a copper wire, or an aluminum wire. The transverse wire 26 may be formed on the first base layer 41 through a screen printing process. The first electrode 23 may be a silver sheet, a copper sheet, or an aluminum sheet. The first electrodes 23 and the transverse wires 26 may be integrally formed on the first base layer 41. The longitudinal wire 27 may be a silver wire, a copper wire, or an aluminum wire. The longitudinal wire 27 can be formed on the first base layer 41 by a screen printing process. The second electrode 24 may be a silver sheet, a copper sheet, or an aluminum sheet. The second electrodes 24 and the longitudinal wires 27 may be integrally formed on the first base layer 41.

In an embodiment, each transverse wire 26 has multiple transverse-overlapping sections 263 arranged at intervals, each longitudinal wire 27 has multiple longitudinal-overlapping sections 273 arranged at intervals. The multiple transverse-overlapping sections 263 overlap with the multiple longitudinal-overlapping sections 273. In an embodiment, orthographic projections of the multiple transverse-overlapping sections 263 on the display region 101 overlap with orthographic projections of the multiple longitudinal-overlapping sections 273 on the display region 101. The first electrodes 23 are disposed at the multiple transverse-overlapping sections 263. The second electrodes 24 are disposed at the multiple longitudinal-overlapping sections 273.

In an embodiment, each transverse-overlapping section 263 is formed at the connecting line between the first bending point 261 and the second bending point 262 adjacent to the first bending point 261. Each transverse-overlapping section 263 is connected between two first electrodes 23. Each longitudinal-overlapping section 273 is formed at the connecting line between the third bending point 271 and the fourth bending point 272 adjacent to the third bending point 271. Each longitudinal-overlapping section 273 is connected between two second electrodes 24. By connecting each transverse-overlapping section 263 between two first electrodes 23 and connecting each longitudinal-overlapping section 273 between two second electrodes 24, the number of the first electrodes 23 and the number of the second electrodes 24 can be increased, and then the number of capacitors 20 can be increased to improve a pixel resolution of the fingerprint image. In other embodiments, the first electrode 23 may further be disposed at a middle part of the transverse-overlapping section 263, and the second electrode 24 may further be disposed at a middle part of the longitudinal-overlapping section 273, so that each transverse-overlapping section 263 can be connected with three first electrodes 23, and each longitudinal-overlapping section 273 can be connected with three second electrodes 24, which further improves the number of the capacitors 20.

Figure 10:
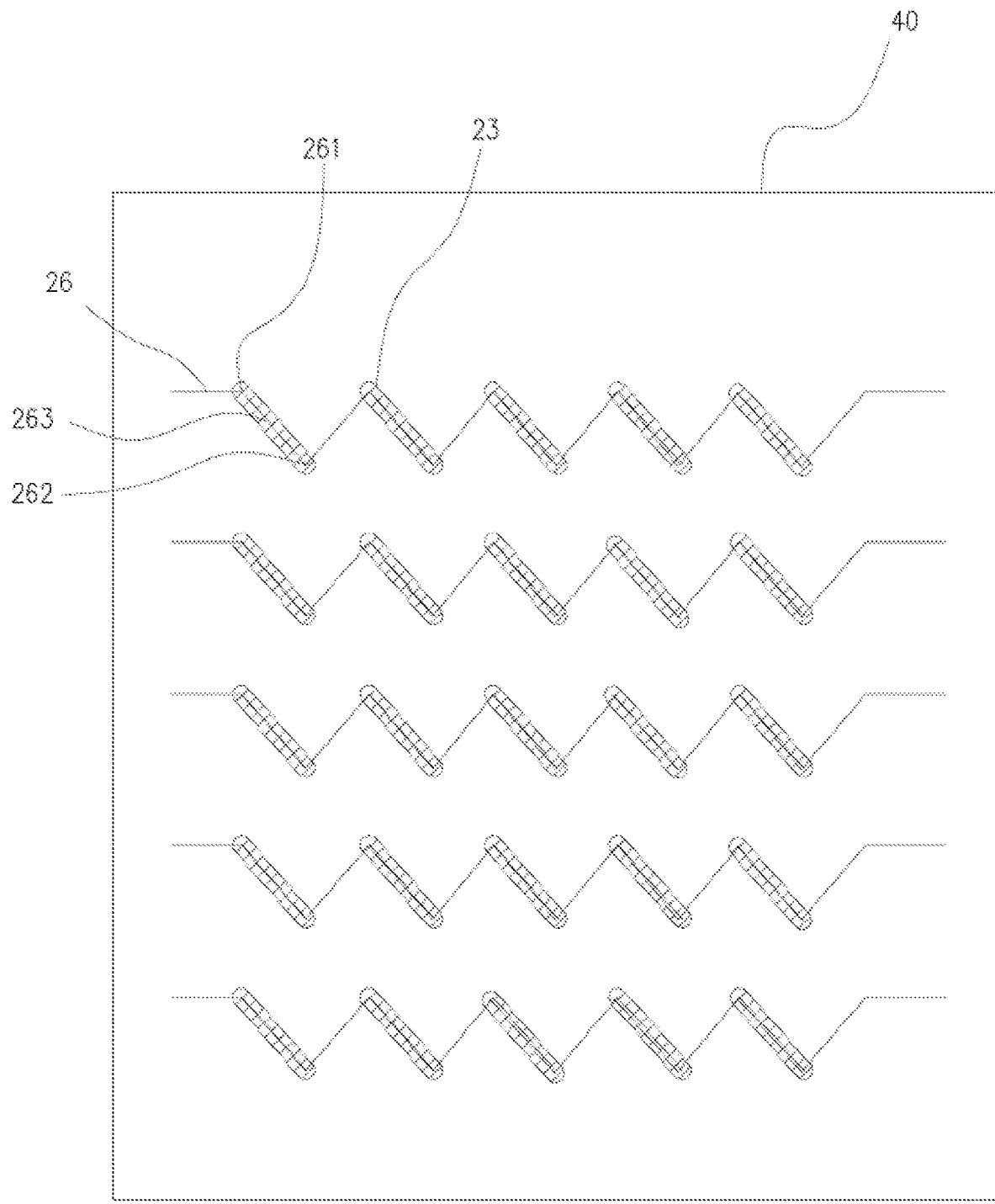
FIG. 10 is a schematic view of a first electrode layer of a display screen provided by another embodiment of the present disclosure.
Figure 11:
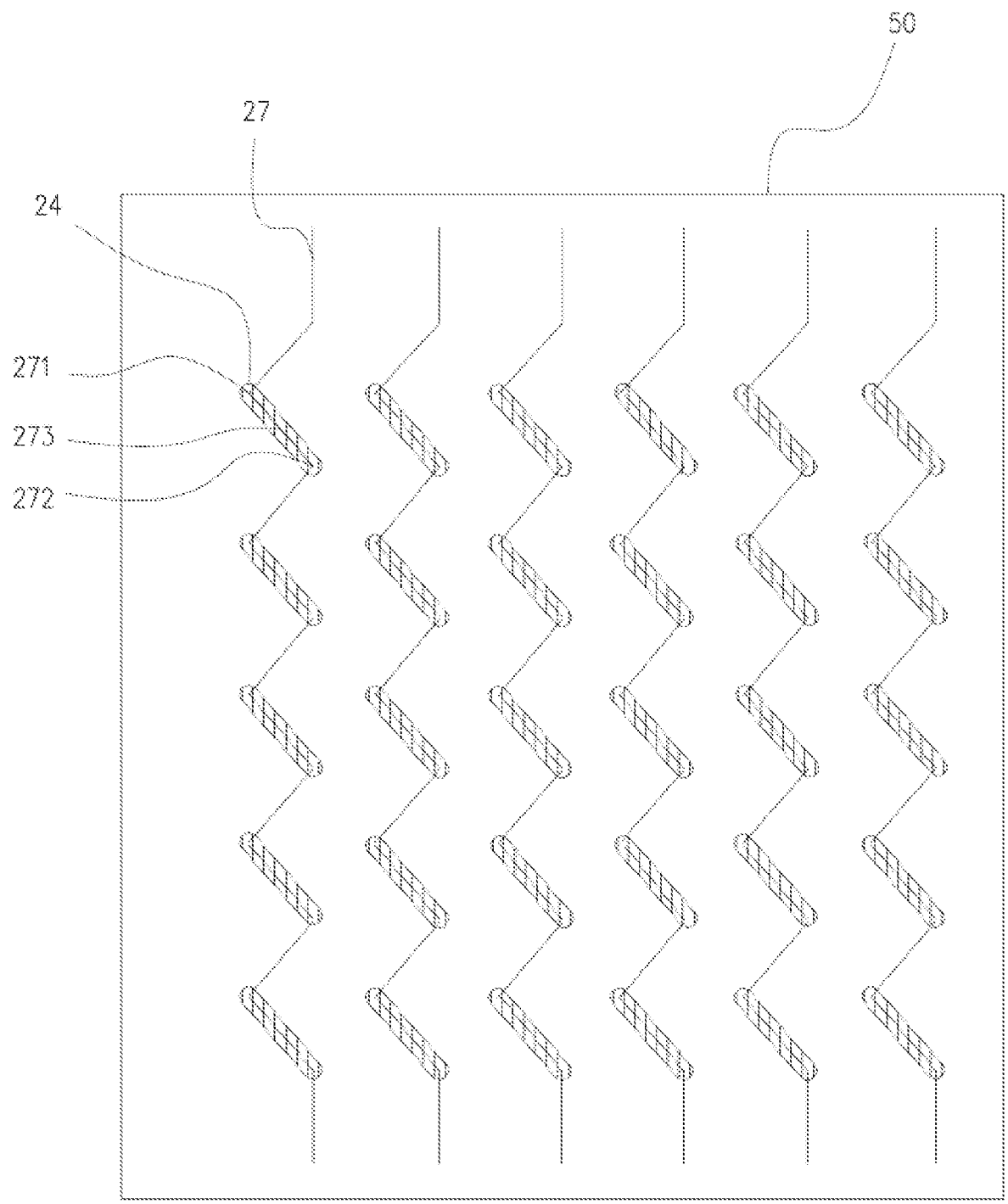
FIG. 11 is a schematic view of a second electrode layer of a display screen provided by another embodiment of the present disclosure.
Figure 12:
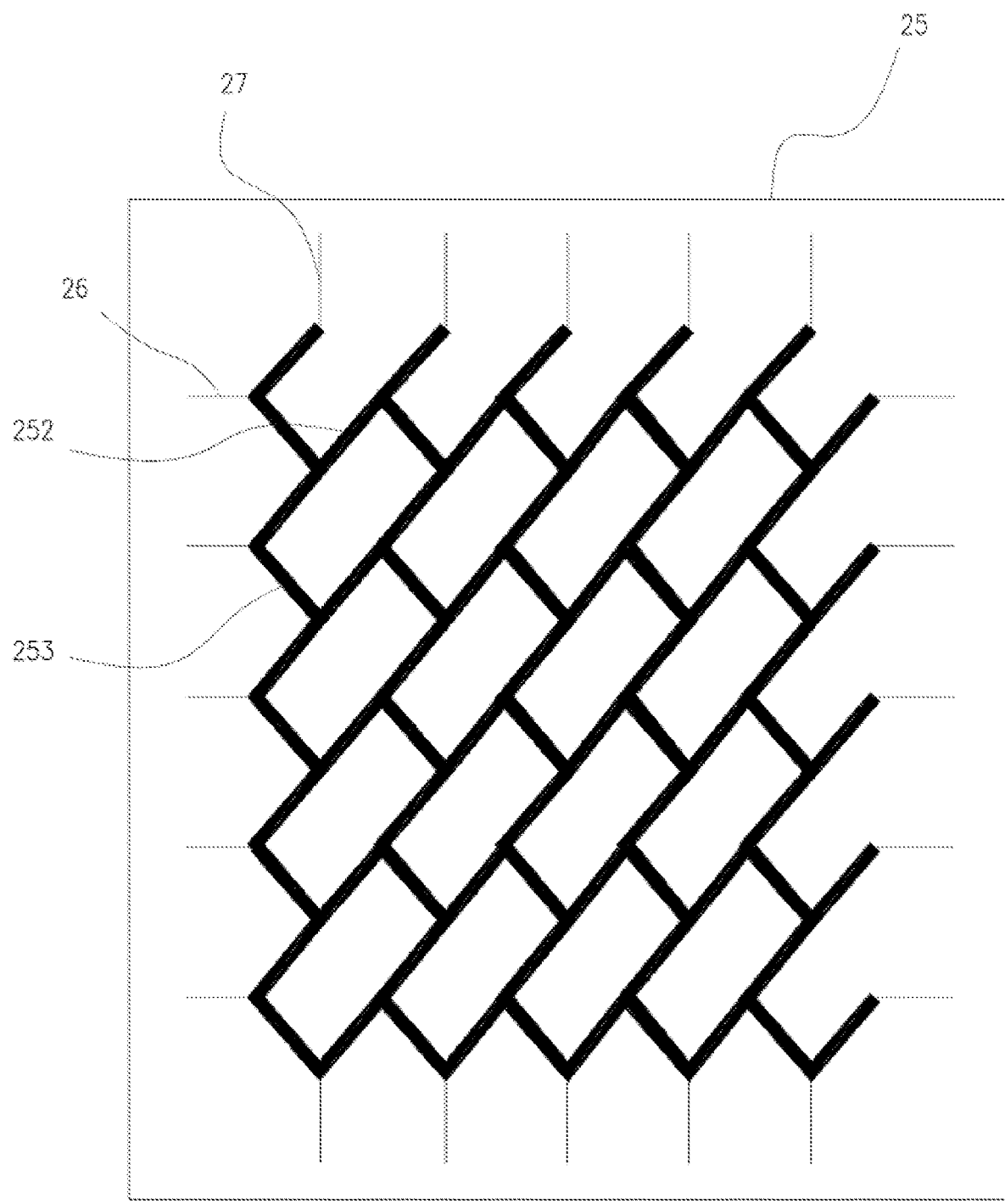
FIG. 12 is a schematic view of a capacitive dielectric layer of a display screen provided by another embodiment of the present disclosure.

In another embodiment, referring to FIG. 10, FIG. 11, and FIG. 12, which are substantially the same as the embodiment illustrated in FIG. 6, except that the first electrode 23 is a strip-shaped metal sheet. The second electrode 24 is a strip-shaped metal sheet. The first electrode 23 extends along the transverse-overlapping section 263. The second electrode 24 extends along the longitudinal-overlapping section 273. The first electrode 23 overlaps with the second electrode 24. In an embodiment, the orthographic projection of the first electrode 23 on the display region 101 overlaps with the orthographic projection of the second electrode 24 on the display region 101. In an embodiment, the first electrode 23 covers the transverse-overlapping section 263. The first electrode 23 is connected between the first bending point 261 and the second bending point 262 adjacent to the first bending point 261. The second electrode 24 covers the longitudinal-overlapping section 273. The second electrode 24 is connected between the third bending point 271 and the fourth bending point 272 adjacent to the third bending point 271. A width of the first electrode 23 is larger than a width of the transverse-overlapping section 263, a width of the second electrode 24 is larger than a width of the longitudinal-overlapping section 273, such that the first electrode 23 has a larger width and the second electrode 24 has a larger width, and then an area of the first electrode 23 and an area of the second electrode 24 can be increased, thus a capacity of each capacitor 20 can be increased. The capacitive dielectric layer 25 has transverse dielectric traces 252 extending parallel to the transverse wires 26 and longitudinal dielectric traces 253 extending parallel to the longitudinal wires 27. The transverse dielectric traces 252 overlap with the longitudinal dielectric traces 253 at positions where the transverse-overlapping sections 263 are opposite to the longitudinal-overlapping sections 273. Overlapping portions of the transverse dielectric traces 252 and the longitudinal dielectric traces 253 form the capacitive dielectric units 251 of the capacitor 20. A width of the transverse dielectric trace 252 is equal to a width of the longitudinal dielectric trace 253. The width of the transverse dielectric trace 252 is larger than or equal to the width of the first electrode 23.

Figure 13:
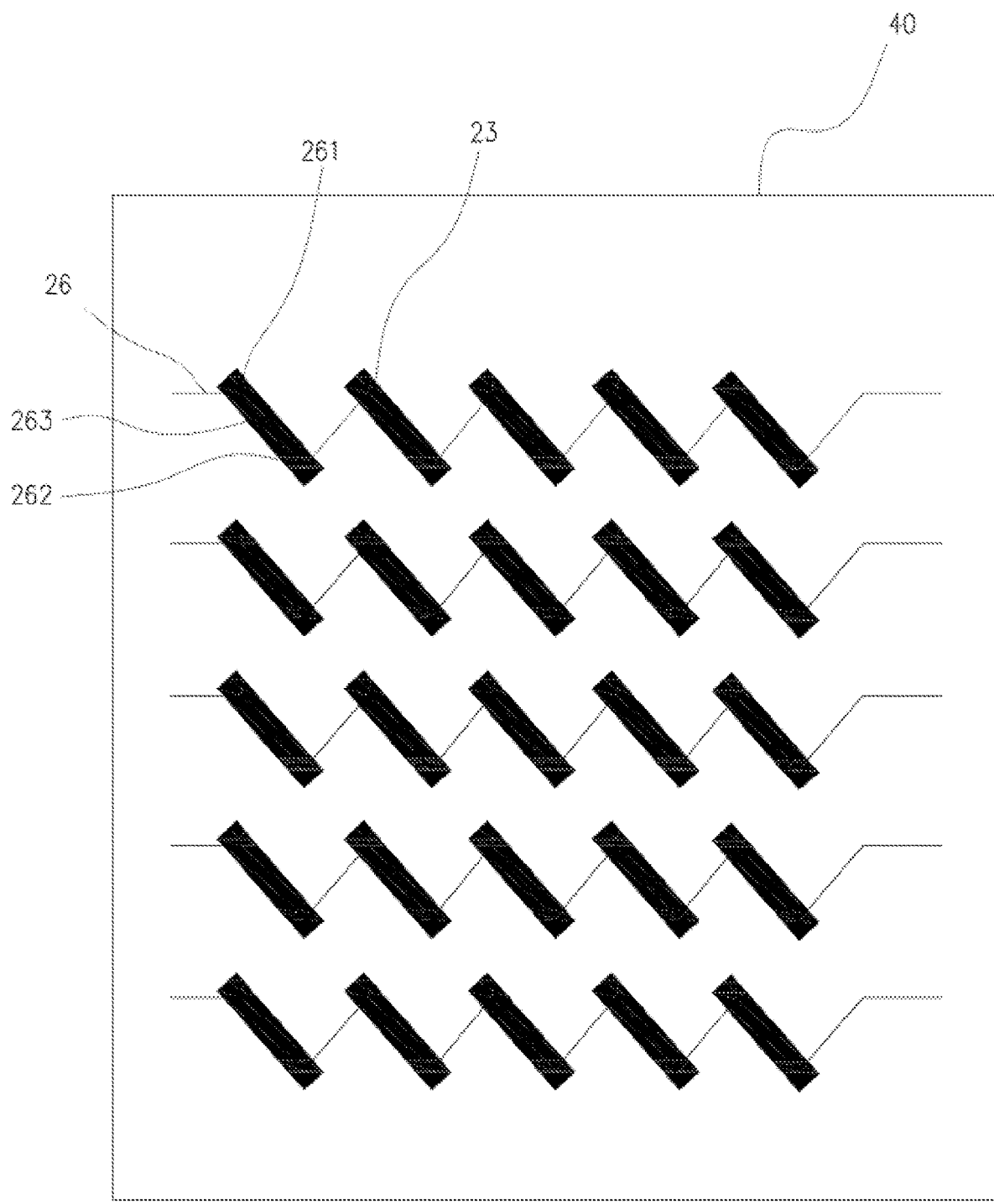
FIG. 13 is a schematic view of a first electrode layer of a display screen provided by another embodiment of the present disclosure.
Figure 14:
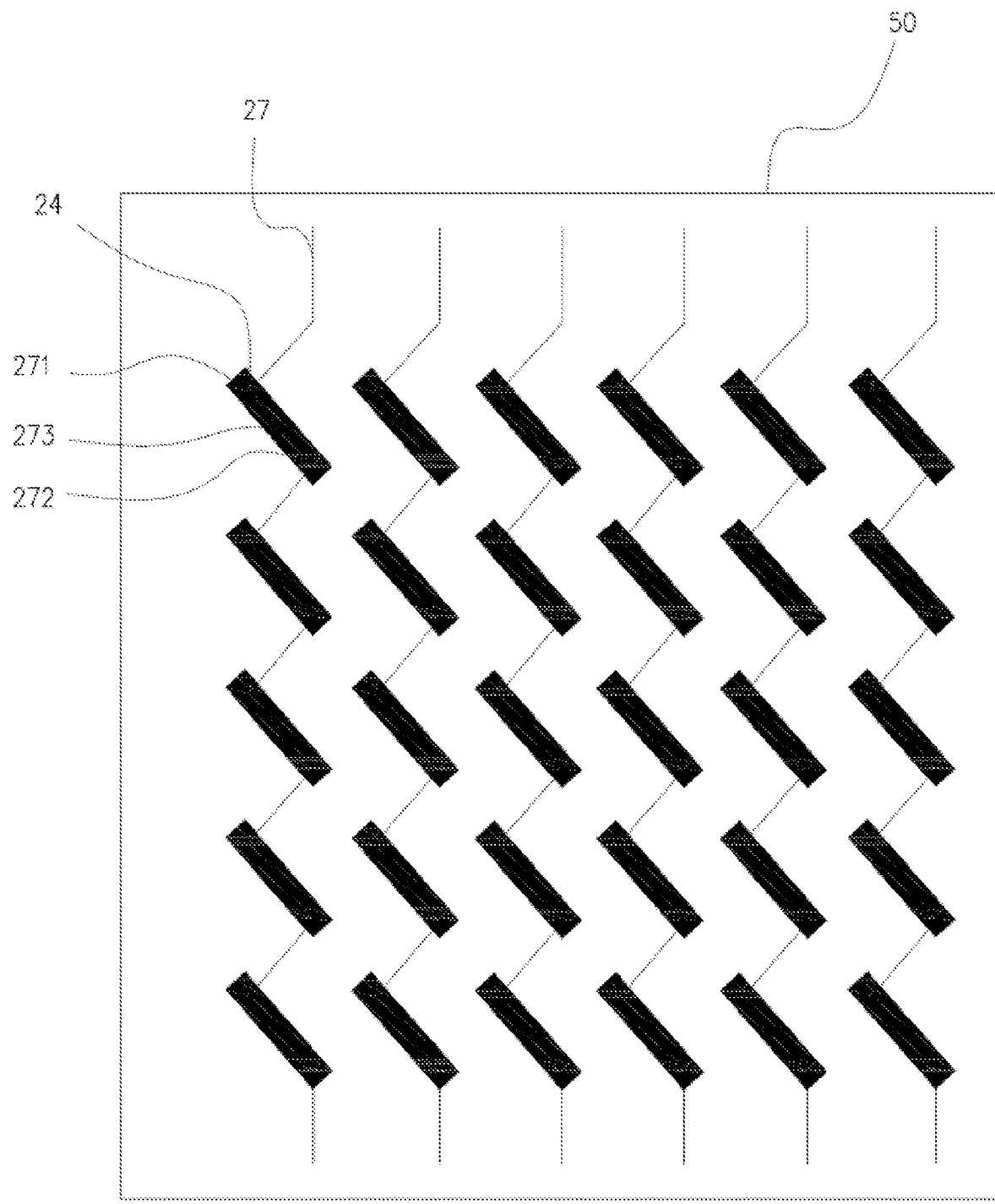
FIG. 14 is a schematic view of a second electrode layer of a display screen provided by another embodiment of the present disclosure.

In another embodiment, referring to FIGS. 13 and 14, which are substantially the same as that illustrated in FIGS. 10 and 11, except that the capacitive dielectric layer 25 between the first electrode layer 40 and the second electrode layer 50 is omitted. The first electrode layer 40 is attached with the second electrode layer 50. That is, the first base layer 41 is attached with the second base layer 51. The width of the first electrode 23 and the width of the second electrode 24 is further increased. The width of the first electrode 23 and the width of the second electrode 24 are each slightly smaller than a distance between two adjacent pixels 10. In other embodiments, the first base layer 41 may be spaced apart from the second base layer 51.

Further, referring to FIG. 1, a region where the multiple capacitors 20 are arranged forms a fingerprint recognition region. A periphery of the fingerprint recognition region is aligned with a periphery of the display region 101.

In an embodiment, since each capacitor 20 is corresponding to the region between two adjacent pixels 10, the multiple capacitors 20 are located in the display region 101 of the display screen 100, that is, the fingerprint recognition region is formed in the display region 101 of the display screen 100. In an embodiment, orthographic projections of the multiple capacitors 20 fall into the display region 101 of the display screen 100. The fingerprint recognition region is integrated in the display region 101 of the display screen 100, which avoids disposing the fingerprint recognition region in the non-display region 102, reduces a proportion of the non-display region 102, and increases the screen-to-body ratio of the display region 101, so that the display screen 100 can meet full-screen requirements and in-screen fingerprint recognition requirements. The periphery of the fingerprint recognition region is aligned with the periphery of the display region 101, so that the fingerprint recognition region can occupy the entire display region 101 of the display screen 100, and full-screen fingerprint-recognition requirements of the display screen 100 are met.

Figure 15:
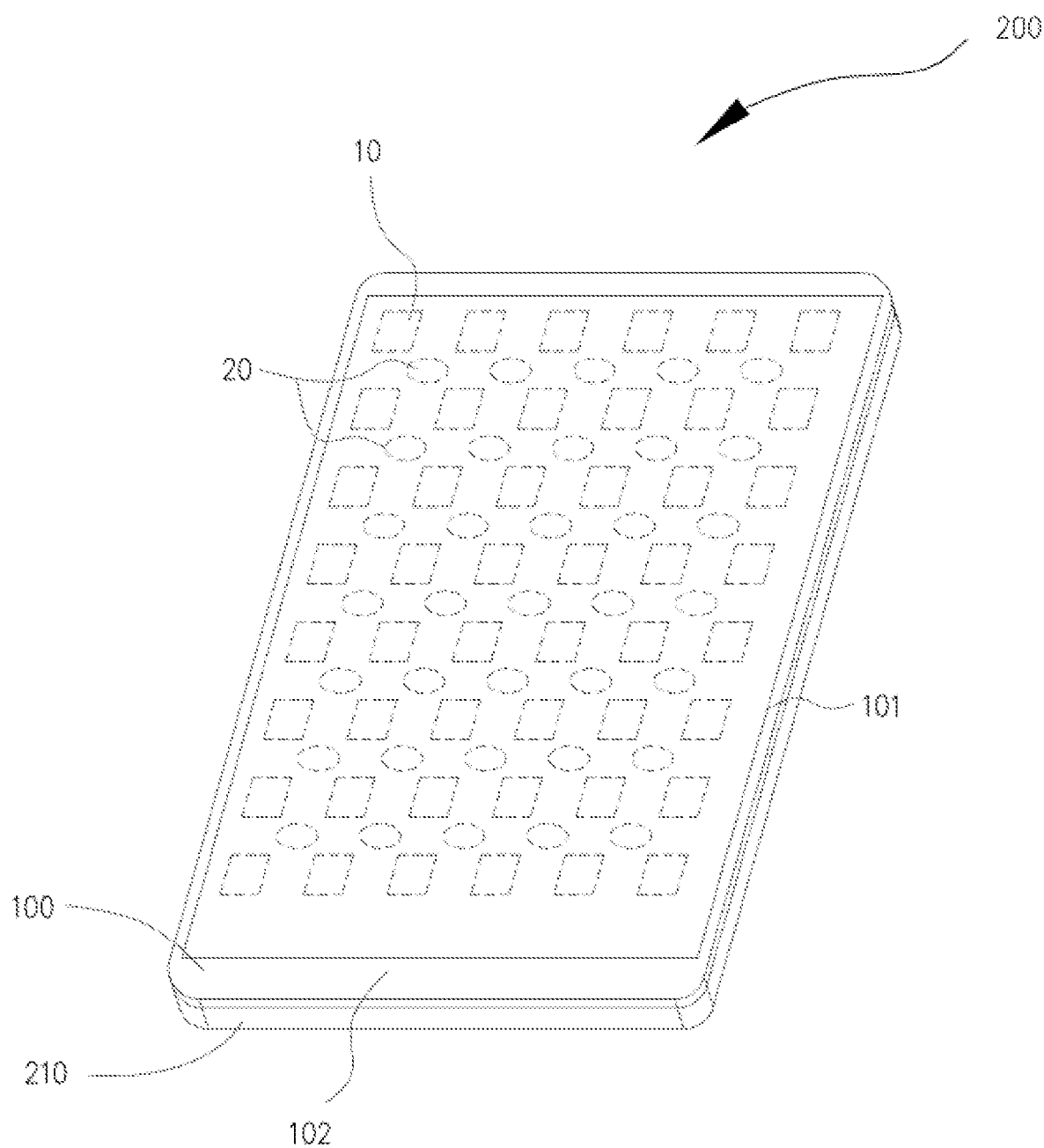
FIG. 15 is a schematic view of an electronic device provided by an embodiment of the present disclosure.

Referring to FIG. 15, the present disclosure also provides an electronic device 200. The electronic device 200 includes the display screen 100 described above. The electronic device 200 further includes a back cover 210 and a main board 220. The back cover 210 is covered with the display screen 100. The main board 220 is fixed between the back cover 210 and the display screen 100. The main board 220 is electrically connected with the display screen 100. The display screen 100 may be a mobile phone, a tablet computer, a notebook computer, and other devices.

Figure 16:
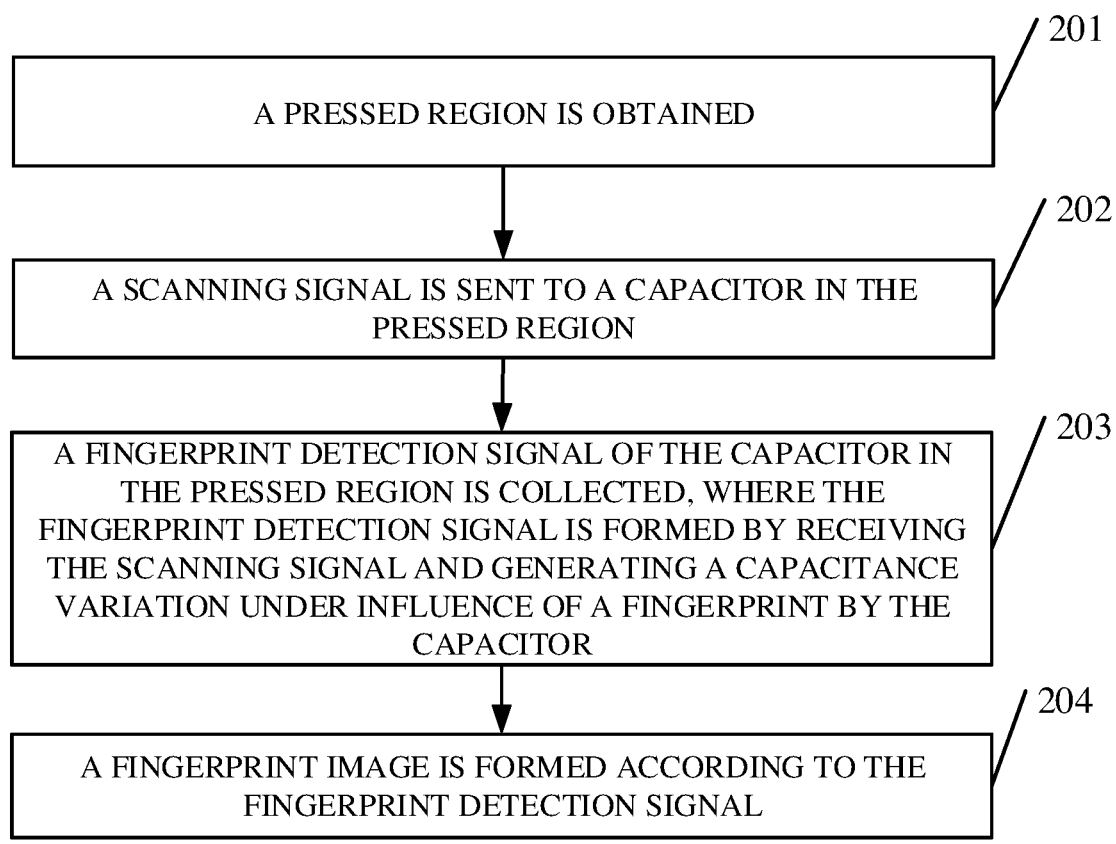
FIG. 16 is a schematic flow chart of a fingerprint recognition method provided by an embodiment of the present disclosure.

Referring to FIG. 16, the present disclosure also provides a fingerprint recognition method. The method is applicable to the electronic device 200 described above and can begin at block 201.

At block 201, a pressed region is obtained.

In an embodiment, the pressed region is consistent with a region where a finger 60 of a user touches the display screen 100. The touch layer of the display screen 100 can sense a pressing of the finger 60 of the user on the pressed region to generate a pressing signal. The electronic device 200 obtains the pressed region according to the pressing signal of the touch layer.

The pressed region can be a multi-point region or a single-point region on the display screen 100. That is, the user can touch the display screen 100 with a single finger 60 or with multiple fingers 60 to realize single-finger fingerprint recognition or multi-finger fingerprint recognition.

At block 202, a scanning signal is sent to the capacitor 20 in the pressed region.

In an embodiment, the electronic device 200 determines the region where the fingerprint touches the display screen 100 according to the pressed region, so as to determine the capacitors 20 in the pressed region. The first electrode 23 of each of the capacitors 20 is connected with the transverse wire 26, and the second electrode 24 of each of the capacitors 20 is connected with the longitudinal wire 27. The electronic device 200 sends the scanning signal to the longitudinal wire 27 connected with the capacitor 20 in the pressed region, so that the capacitor 20 in the pressed region stores charges upon receiving the scanning signal. In this way, the amount of charges absorbed by the fingerprint can be sensed by the first electrode 23 of each of the capacitors 20 in the pressed region, such that the fingerprint can be recognized. In other embodiments, the scanning signal may also be sent to the transverse wire 26 of the capacitor 20 in the pressed region.

At block 203, a fingerprint detection signal of the capacitor 20 in the pressed region is collected, where the fingerprint detection signal is formed by receiving the scanning signal and generating a capacitance variation under influence of a fingerprint by the capacitor 20. In an embodiment, charges are stored in the capacitor 20 in the pressed region upon receiving the scanning signal, and the fingerprint detection signal of the capacitor 20 in the pressed region is collected, where the fingerprint detection signal is formed due to a capacitance variation which is brought by the finger 60 to the capacitor 20 in the pressed region when the finger 60 is adjacent to the display screen 100.

In an embodiment, the fingerprint has the fingerprint ridge region a and the fingerprint valley region b. The fingerprint ridge region a in contact with the pressed region absorbs a first amount of charges from the capacitor 20 corresponding to the fingerprint ridge region a, the fingerprint valley region b in contact with the pressed region absorbs a second amount of charges from the capacitor 20 corresponding to the fingerprint valley region b, so that the capacitor 20 corresponding to the fingerprint ridge region a generates the first capacitance variation, and the capacitor 20 corresponding to the fingerprint valley region b generates the second capacitance variation. The electronic device 200 forms the fingerprint ridge detection signal and the fingerprint valley detection signal according to the first capacitance variation and the second capacitance variation, respectively.

At block 204, a fingerprint image is formed according to the fingerprint detection signal.

In an embodiment, the electronic device 200 performs processing to obtain the fingerprint image according to the fingerprint valley detection signal, the fingerprint valley detection signal, and coordinates of each of the capacitors 20 in the pressed region.

The embodiments of the present disclosure also provide a computer storage medium. The computer storage medium stores computer programs for electronic data interchange which are operable with a computer to execute all or part of operations of any of methods described in the above-described method embodiments. The above-mentioned computer may be the electrical device 200.

The embodiments of the present disclosure also provide a computer program product. The above-mentioned computer program product includes a non-transitory computer readable storage medium that stores computer programs. The above-mentioned computer programs are operable with a computer to perform all or part of the operations of any of the methods described in the above method embodiments. The computer program product may be a software installation package. The computer may be the electrical device 200.

It should be noted that, for the sake of simplicity, the foregoing method embodiments are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the embodiments described in the specification are exemplary embodiments and the actions and modules involved are not necessarily essential to the present disclosure.

In the foregoing embodiments, the description of each embodiment has its own emphasis. For parts not described in detail in one embodiment, reference may be made to related descriptions in other embodiments.

In the embodiments of the disclosure, the apparatus disclosed in embodiments provided herein may be implemented in other manners. For example, the device/apparatus embodiments described above are merely illustrative; for instance, the division of the unit is only a logical function division and there can be other manners of division during actual embodiments, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the embodiments.

In addition, the functional units in various embodiments of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various embodiments of the present disclosure. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skill in the art that all or part of the various methods of the embodiments described above may be accomplished by means of a program to instruct associated hardware, the program may be stored in a computer-readable memory, which may include a flash memory, a ROM, a RAM, Disk or CD, and so on.

The embodiments of the present disclosure are described in detail above, specific examples are used herein to describe the principle and embodiment manners of the present disclosure. The description of the above embodiments is merely used to help understand the method and the core idea of the present disclosure. Meanwhile, those skilled in the art may make modifications to the specific embodiment manners and the application scope according to the idea of the present disclosure. In summary, the contents of the specification should not be construed as limiting the present disclosure.

To sum up, although the preferred embodiments of the present disclosure are disclosed above, which are not intended to limit the present disclosure. Those skilled in the art can make various improvements and modifications without departing from the spirit and scope of the present disclosure. Therefore, the protection scope of the present disclosure is subject to the scope defined by the claims.

The above description are preferred embodiments of the present disclosure, and it is noted that various improvements and modifications can be made without departing from the principle of the application to those of ordinary skill in the art, and the improvement and the modification are also considered as the protection scope of the present disclosure.

What is claimed is:

1. A display screen having a display region, wherein
the display screen is provided with a plurality of pixels and a plurality of capacitors arranged at intervals in the display region, and an orthographic projection of the capacitor on the display region is located between orthographic projections of two adjacent pixels on the display region;
the capacitor is configured to generate a fingerprint ridge detection signal corresponding to a fingerprint ridge region and/or generate a fingerprint valley detection signal corresponding to a fingerprint valley region, wherein the fingerprint ridge detection signal is formed due to a first capacitance variation which is brought by the fingerprint ridge region to the capacitor corresponding to the fingerprint ridge region when the fingerprint ridge region is adjacent to the display screen, and the fingerprint valley detection signal is formed due to a second capacitance variation which is brought by the fingerprint valley region to the capacitor corresponding to the fingerprint valley region when the fingerprint valley region is adjacent to the display screen;
the capacitor comprises a first electrode and a second electrode opposite to the first electrode;
the plurality of pixels are arranged in an array;
the display screen is provided with a plurality of transverse wires and a plurality of longitudinal wires, the transverse wire being arranged between two adjacent rows of pixels, and the longitudinal wire being arranged between two adjacent columns of pixels; and
an orthographic projection of the first electrode of the capacitor on the display region overlaps with an orthographic projection of the second electrode of the capacitor on the display region at an intersection of an orthographic projection of the transverse wire on the display region and an orthographic projection of the longitudinal wire on the display region, the first electrode and the second electrode being respectively connected with the transverse wire and the longitudinal wire.

2. The display screen of claim 1, wherein an orthographic projection of the first electrode on a surface of the display screen coincides with an orthographic projection of the second electrode on the surface of the display screen.

3. The display screen of claim 2, further comprising a capacitive dielectric layer, wherein the capacitive dielectric layer comprises a plurality of capacitive dielectric units, and the capacitive dielectric unit is located between the first electrode and the second electrode.

4. The display screen of claim 3, wherein an outer diameter of the capacitive dielectric unit is greater than or equal to an outer diameter of the first electrode, and is greater than or equal to an outer diameter of the second electrode.

5. The display screen of claim 1, comprising a plurality of first pixels arranged in an array, a plurality of second pixels arranged in an array, and a plurality of third pixels arranged in an array, wherein the plurality of first pixels are staggered with the plurality of second pixels at intervals in a transverse direction and a longitudinal direction;
each row of third pixels is located between two adjacent rows of first pixels, wherein in each row of third pixels, the third pixel is staggered from the first pixel and the second pixel; and each column of third pixels is located between two adjacent columns of first pixels, wherein in each column of third pixels, the third pixel is staggered from the first pixel and the second pixel.

6. The display screen of claim 1, wherein
each transverse wire has a plurality of first bending points in equidistant arrangement in a transverse direction, a plurality of second bending points in equidistant arrangement in the transverse direction, and a plurality of connecting lines each connected between the first bending point and the second bending point; and
each first bending point is disposed between the first pixel and the second pixel adjacent to the first pixel in a corresponding column, and each second bending point is disposed between two adjacent third pixels in a corresponding column.

7. The display screen of claim 6, wherein
each longitudinal wire has a plurality of third bending points in equidistant arrangement in the longitudinal direction, a plurality of fourth bending points in equidistant arrangement in the longitudinal direction, and a plurality of connecting lines each connected between the third bending point and the fourth bending point;
each third bending point is disposed between the first pixel and the second pixel adjacent to the first pixel in a corresponding column, and each fourth bending point is disposed between two adjacent third pixels in a corresponding column; and
the third bending point is opposite to the first bending point in a one-to-one correspondence, and the fourth bending point is opposite to the second bending point in a one-to-one correspondence.

8. The display screen of claim 7, wherein
a plurality of first electrodes are connected with the transverse wires at positions corresponding to the plurality of first bending points and the plurality of second bending points; and
a plurality of second electrodes are connected with the longitudinal wires at positions corresponding to the plurality of third bending points and the plurality of fourth bending points.

9. The display screen of claim 1, wherein
the transverse wire has a plurality of transverse-overlapping sections arranged at intervals, the longitudinal wire has a plurality of longitudinal-overlapping sections arranged at intervals, and orthographic projections of the plurality of transverse-overlapping sections on the display region overlap with orthographic projections of the plurality of longitudinal-overlapping sections on the display region; and
a plurality of first electrodes are disposed at the plurality of transverse-overlapping sections, and a plurality of second electrodes are disposed at the plurality of longitudinal-overlapping sections.

10. The display screen of claim 9, wherein the transverse-overlapping section is connected between two first electrodes, and the longitudinal-overlapping section is connected between the two second electrodes.

11. The display screen of claim 9, wherein the first electrode extends along the transverse-overlapping section, the second electrode extends along the longitudinal-overlapping section, and an orthographic projection of the first electrode on the display region overlaps with an orthographic projection of the second electrode on the display region.

12. The display screen of claim 11, wherein a width of the first electrode is greater than a width of the transverse-overlapping section, and a width of the second electrode is greater than a width of the longitudinal-overlapping section.

13. The display screen of claim 1, comprising a protective layer and a pixel layer stacked with the protective layer, wherein the plurality of pixels are arranged in the pixel layer, and the plurality of capacitors are arranged between the protective layer and the pixel layer.

14. The display screen of claim 13, further comprising an upper polarizer layer stacked between the protective layer and the pixel layer, a liquid crystal layer, a thin film transistor layer, a lower polarizer layer, a base layer, and a backlight layer that are sequentially stacked on a side of the pixel layer away from the protective layer, the plurality of capacitors being arranged between the upper polarizer layer and the protective layer.

15. The display screen of claim 13, further comprising an upper polarizer layer stacked between the protective layer and the pixel layer, a liquid crystal layer, a thin film transistor layer, a lower polarizer layer, a base layer, and a backlight layer that are sequentially stacked on a side of the pixel layer away from the protective layer, the plurality of capacitors being arranged between the upper polarizer layer and the protective layer.

16. The display screen of claim 13, comprising a cathode layer, an organic electroluminescent layer, an anode layer, and a base layer that are sequentially stacked with the protective layer, the plurality of pixels being arranged in the organic electroluminescent layer, and the plurality of capacitors being arranged between the cathode layer and the protective layer.

17. The display screen of claim 1, wherein a region where the plurality of capacitors are arranged forms a fingerprint recognition region, and a periphery of the fingerprint recognition region is aligned with a periphery of the display region.

18. An electronic device comprising a display screen having a display region and a back cover covered with the display screen, wherein
the display screen is provided with a plurality of pixels and a plurality of capacitors arranged at intervals in the display region, and an orthographic projection of the capacitor on the display region is located between orthographic projections of two adjacent pixels on the display region;
the capacitor is configured to generate a fingerprint ridge detection signal corresponding to a fingerprint ridge region and/or generate a fingerprint valley detection signal corresponding to a fingerprint valley region, wherein the fingerprint ridge detection signal is formed due to a first capacitance variation which is brought by the fingerprint ridge region to the capacitor corresponding to the fingerprint ridge region when the fingerprint ridge region is adjacent to the display screen, and the fingerprint valley detection signal is formed due to a second capacitance variation which is brought by the fingerprint valley region to the capacitor corresponding to the fingerprint valley region when the fingerprint valley region is adjacent to the display screen;
the capacitor comprises a first electrode and a second electrode opposite to the first electrode;
the plurality of pixels are arranged in an array;

the display screen is provided with a plurality of transverse wires and a plurality of longitudinal wires, the transverse wire being arranged between two adjacent rows of pixels, and the longitudinal wire being arranged between two adjacent columns of pixels; and an orthographic projection of the first electrode of the capacitor on the display region overlaps with an orthographic projection of the second electrode of the capacitor on the display region at an intersection of an orthographic projection of the transverse wire on the display region and an orthographic projection of the longitudinal wire on the display region, the first electrode and the second electrode being respectively connected with the transverse wire and the longitudinal wire.

19. A fingerprint recognition method applicable to an electronic device, comprising:

obtaining a pressed region in contact with a finger of a user, wherein the pressed region is in a display region of a display screen of the electronic device, the display screen is provided with a plurality of pixels and a plurality of capacitors arranged at intervals in the display region, and an orthographic projection of the capacitor on the display region is located between orthographic projections of two adjacent pixels on the display region;

sending a scanning signal to a capacitor in the pressed region;

collecting a fingerprint detection signal of the capacitor in the pressed region, wherein the fingerprint detection signal is formed by receiving the scanning signal and generating a capacitance variation under influence of a fingerprint by the capacitor; and forming a fingerprint image according to the fingerprint detection signal;

wherein the capacitor comprises a first electrode and a second electrode opposite to the first electrode;

wherein the plurality of pixels are arranged in an array;

wherein the display screen is provided with a plurality of transverse wires and a plurality of longitudinal wires, the transverse wire being arranged between two adjacent rows of pixels, and the longitudinal wire being arranged between two adjacent columns of pixels; and wherein an orthographic projection of the first electrode of the capacitor on the display region overlaps with an orthographic projection of the second electrode of the capacitor on the display region at an intersection of an orthographic projection of the transverse wire on the display region and an orthographic projection of the longitudinal wire on the display region, the first electrode and the second electrode being respectively connected with the transverse wire and the longitudinal wire.

* * * * *